(12) United States Patent  
Carrick et al.

(10) Patent No.: US 7,076,164 B2  
(45) Date of Patent: Jul. 11, 2006

(54) SYSTEM AND METHOD FOR MEASURING POWER OF OPTICAL SIGNALS CARRIED OVER A FIBER OPTIC LINK

(75) Inventors: John C. Carrick, Wakefield, MA (US); Paul C Talmadge, Ansonia, CT (US); Eric B. Saint Georges, Scarsdale, NY (US); Stuart D. Brorson, New York, NY (US)

(73) Assignee: Tellabs Operations, Inc., Naperville, IL (US)

( * ) Notice: Subject to any disclaimer, the term of this patent is extended or adjusted under 35 U.S.C. 154(b) by 382 days.

(21) Appl. No.: 10/178,570

(22) Filed: Jun. 24, 2002

(65) Prior Publication Data

US 2003/0002098 A1    Jan. 2, 2003

Related U.S. Application Data

(60) Provisional application No. 60/300,310, filed on Jun. 22, 2001.

(51) Int. Cl.  
*H04B 17/00* (2006.01)

(52) U.S. Cl. .......................... 398/32; 398/110; 398/31; 379/32.01; 340/3.1

(58) Field of Classification Search ............... 359/110; 398/31, 32, 34, 38; 379/32.01; 340/3.1; 356/320; 372/38.09

See application file for complete search history.

(56) References Cited

U.S. PATENT DOCUMENTS

| | | | | |
|---|---|---|---|---|
| 4,838,032 | A | * | 6/1989 | Maslaney et al. ............. 62/3.7 |
| 5,463,487 | A |   | 10/1995 | Epworth ..................... 359/124 |
| 5,513,029 | A | * | 4/1996 | Roberts ...................... 359/177 |
| 5,699,081 | A | * | 12/1997 | Denkin et al. .......... 359/337.12 |
| 5,969,833 | A |   | 10/1999 | Jensen ........................ 359/110 |
| 5,969,840 | A | * | 10/1999 | Roberts ....................... 398/32 |
| 5,973,811 | A | * | 10/1999 | Madey ........................ 398/131 |
| 6,025,949 | A | * | 2/2000 | Anderson ................... 359/179 |
| 6,043,915 | A | * | 3/2000 | Giles et al. ................. 359/132 |
| 6,111,676 | A | * | 8/2000 | Lemus et al. .................... 398/1 |
| 6,239,889 | B1 | * | 5/2001 | Harley et al. ............... 359/124 |
| 6,362,760 | B1 | * | 3/2002 | Kober et al. ................ 341/141 |
| 6,624,918 | B1 | * | 9/2003 | French et al. ............... 330/308 |

FOREIGN PATENT DOCUMENTS

EP         0 911 994 A2       4/1999

* cited by examiner

*Primary Examiner*—David C. Payne  
(74) *Attorney, Agent, or Firm*—Baker Botts L.L.P.

(57) ABSTRACT

A pilot tone generator receives optical energy from an optical communication medium carrying a plurality of optical signals. Each optical signal carries data modulated at a unique wavelength and further modulated with a unique identification signal. The identification signal has an amplitude corresponding to an optical power of the associated optical signal. The pilot tone receiver detects each identification signal from the optical energy received and determines its corresponding amplitude. The pilot tone receiver calculates the optical power of each optical signal in the optical energy in response to the amplitude of the associated identification signal.

20 Claims, 2 Drawing Sheets

SYSTEM AND METHOD FOR MEASURING POWER OF OPTICAL SIGNALS CARRIED OVER A FIBER OPTIC LINK

RELATED APPLICATION

This application claims the benefit of U.S. Provisional Application No. 60/300,310 filed Jun. 22, 2001.

TECHNICAL FIELD OF THE INVENTION

The present invention relates in genaral to optical networks and more particularly to a system and method for measuring power of optical signals carried over a fiber optic link.

BACKGROUND OF THE INVENTION

In a wavelength division multiplexing (WDM) optical system, it is desirable to measure optical powers of individual optical signals transported along a fiber optic link. Conventional methods of performing such power measurements require expensive components to separate the optical signals transported in the fiber prior to power measurement so that each signal may be measured individually. Not only are they expensive, these optical components tend to be physically bulky and add to the considerations during management of the fiber optic link.

SUMMARY OF THE INVENTION

From the foregoing, it may be appreciated by those skilled in the art that a need has arisen for a technique to measure power of optical signals transferred over a fiber optic link. In accordance with the present invention, a system and method for measuring power of optical signals carried over a fiber optic link are provided that substantially eliminate or greatly reduce disadvantages and problems associated with conventional optical power measurement techniques.

According to an embodiment of the present invention, there is provided a method for measuring power of optical signals carried over a fiber optic link that includes receiving a plurality of optical signals from the fiber optic link with each optical signal including an identification signal modulated therewith. An amplitude of each identification signal received is determined and an optical power of each optical signal is determined in response to the amplitude of each identification signal received.

The present invention provides various technical advantages over conventional optical power measurement techniques. For example, one technical advantage is in the simultaneous measurement of optical power of a plurality of optical signals without separating the optical signals for individual measurement. Another technical advantage is in the use of less costly and reduced number of optical components since only the modulations of many optical signals are detected and analyzed. Yet another technical advantage is to adjust a detection bandwidth according to receiver position in the network, signal to noise ratio of received optical signals, and/or desired accuracy. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
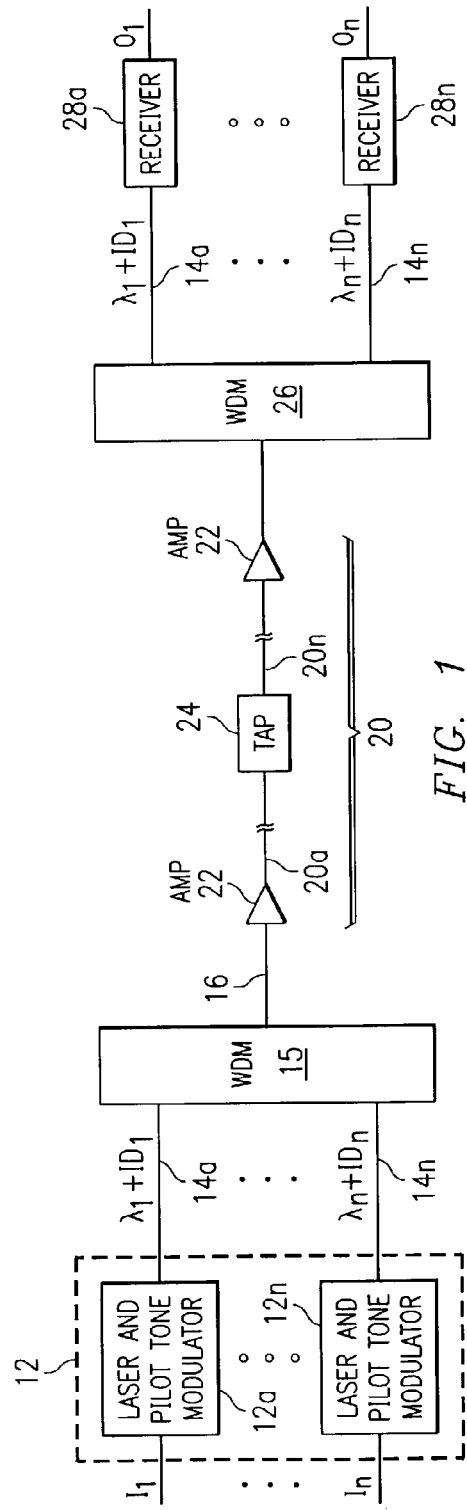
FIG. 1 illustrates a simplified block diagram of an optical network.

FIG. 1 is a simplified block diagram of an optical network 10. Optical network 10 includes a transmitter 12 that receives data inputs $I_1$–$I_n$. Transmitter 12 includes a plurality of laser and pilot tone modulator units 12a–12n. Laser and pilot tone modulator unit 12a generates an optical signal 14a at a unique predetermined wavelength $\lambda_1$ to transport information received at data input $I_1$. Laser and pilot tone modulator unit 12a also modulates a unique identification signal, or pilot tone, $ID_1$ onto its generated optical signal 14a. Similarly, other laser and pilot tone modulator units, such as 12n, generate optical signals 14n where the associated data input $I_n$ is modulated at a unique predetermined wavelength $\lambda_n$ and is modulated with a unique identification signal $ID_n$.

Optical network 10 includes a combiner 15 operable to receive a plurality of optical signals 14a–14n and to combine those signals into a multiple wavelength signal 16. As one particular example, combiner 15 may be a wavelength division multiplexer (WDM). Optical network 10 communicates multiple wavelength signal 16 over an optical communication medium 20. Optical communication medium 20 may have a plurality of spans 20a–20n of fiber, each with an optical amplifier 22 or other types of optical elements including an optical add/drop multiplexer, an optical cross connect unit, signal conditioning devices, and/or lossy elements. One type of optical element used in optical network 10 may be an optical tap 24. Optical tap 24 allows for a distant location to capture a portion of the transmission carried by optical communication medium 20.

Optical network 10 also includes a separator 26 operable to separate individual optical signal 14a–14n from multiple wavelength signal 16. Separator 26 can communicate individual signal wavelengths or ranges of wavelengths to a bank of receivers 28a–28n and/or other optical communication paths. Separator 26 may be, for example, a wavelength division demultiplexer (WDM). Receivers 28a–28n receive respective optical signals 14a–14n for decoding in order to recover the original signal as a respective data output $O_1$–$O_n$.

In order to manage optical network 10, it is desirable to measure the optical power of each optical signal 14a–14n carried over optical communication medium 20. The present invention contemplates the use of identification signals $ID_1$–$ID_n$ to measure the optical power of their corresponding optical signal 14a–14n.

Figure 2:
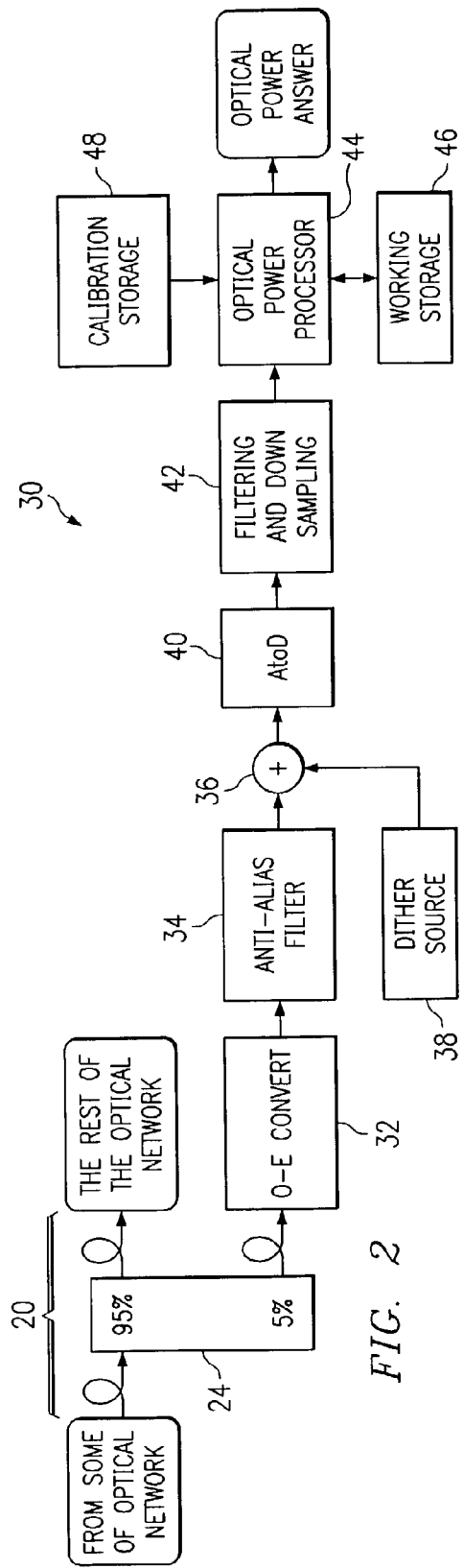
FIG. 2 illustrates a simplified block diagram of a pilot tone receiver in the optical network.

FIG. 2 shows a simplified block diagram of a pilot tone receiver 30 used to measure optical power of optical signals 14a–14n. The functions performed by pilot tone receiver 30 may be performed in hardware, software, or a combination of both. Pilot tone receiver 30 receives a portion of the optical transmission from optical communication medium 20 through optical tap 24. Optical tap diverts a portion of the optical energy from optical communication medium 20 to pilot tone receiver 30. In the example shown, optical tap 24 extracts 5% of the optical energy from optical communication medium 20 though other percentages of extraction may be incorporated as desired.

Pilot tone receiver 30 receives the extracted optical energy of optical signals 14a–14n from optical tap 24 at an optical/electrical converter 32. Optical/electrical converter 22 converts the optical energy into electrical signals. The electrical signals are fed to an anti-alias filter 34 for removal of the high frequency component of the electrical signals. The anti-aliased electrical signals are then combined at a combiner 36 with random noise from a dither source 38 to improve the signal to noise quality of the original signals. The improved electrical signals are then converted into digital form by an analog to digital converter 40.

A filtering and down sampling unit 42 performs several functions on the digital signals received from analog to digital converter 40. Band pass filters may be used in order to isolate the frequencies of interest in the digital signals. The data rate of the digital signals may also be down sampled to minimize processing, allow long time storage, and allow narrow detection bandwidths. Filtering and down sampling unit 42 then detects for each identification signal $ID_1$–$ID_n$, either sequentially or in any desired order through changing of identification signal detection coefficients, and measures its amplitude for processing by an optical power processor 44. Optical power processor 44 stores information from the detected identification signal in a working storage 46 to perform the appropriate processing and coordinates with information about pilot tone receiver 30 determined at manufacture and stored in a calibration storage 48. Optical power processor 42 determines an optical power of an associated optical signal from the amplitude of its identification signal. The measured optical power may then be used to adjust any amplifier gains within optical network 20 as desired.

Identification signals $ID_1$–$ID_n$ may be of a variety of types provided that, when detected, their amplitude is proportional to the optical power of the associated optical signals 14a–14n. Amplitude modulation is one technique for providing the appropriate proportionality. It is also preferable for identification signals $ID_1$–$ID_n$ to not interfere with one another during transport and detection. With no interference, the optical power of many optical signals may be measured simultaneously without individually separating out the optical signals. This requirement can be accomplished through sine wave amplitude modulation with different frequencies for each of identification signals $ID_1$–$ID_n$. Since only a small amount of the optical energy is extracted by optical tap 24 from optical communication medium 20, only small amplitudes of modulation are used for identification signals $ID_1$–$ID_n$. As an example, a 4% amplitude modulation may be performed for identification signals $ID_1$–$ID_n$. By using small amplitudes of modulation, identification signals $ID_1$–$ID_n$ do not interfere with the data traffic carried by optical signals 14a–14n. Through sine wave amplitude modulation detection, the optical power for a given optical signal 14 is determined as follows:

$P=R/(M*G)$, where P is the optical power to be measured,
R is the amplitude of the received identification signal,
M is the index of modulation used to modulate the optical source with the identification signal, and
G is the gain of the modulation receiver.

The accuracy of the measurement of P depends on the accuracy of each of R, M, and G. The accuracy of R, the amplitude of the identification signal, relates to the signal to noise environment at the detection point. At a location with many optical signals 14a–14n present, a noise density level N per Hertz is controlled by the aggregate of these optical signals 14a–14n. The noise in the detection bandwidth B then becomes N*B. The ratio of signal S to noise in the detection bandwidth is thus S/(N*B). If an arbitrarily small optical signal 14 is present at the location, it may have an arbitrarily low signal to noise density ratio S/N. To achieve a specified accuracy for R, it will be required to achieve a minimum signal to noise ratio in the detection bandwidth. Thus, for small signals S, bandwidth B will be minimized to achieve a specified accuracy for R.

The accuracy of M, the modulation index, is dependent upon how precisely the source modulation is known and how the modulation index changes during optical signal 14 propagation. A technique for precisely controlling M at the optical source can be found in copending U.S. patent application Ser. No. 09/567,576 filed May 10, 2000 and entitled "Method and Apparatus for Maintaining a Pre-determined Ratio of a Pilot Tone Power and a Mean Optical Output Power of an Optical Signal" which is hereby incorporated herein by reference. The variation of the modulation index during propagation is mostly dependent on an amount of amplified spontaneous emission noise included in the optical channel measurement. The amount of amplified spontaneous emission noise is related to optical bandwidth. However, with good optical carrier to noise ratios where bit error rates are less than $10^{-12}$, the variation of the modulation index with propagation is generally negligible.

The accuracy of G, the modulation receiver gain, depends upon how well this parameter is known. Pilot tone receiver 30 provides a quantifiable output R sensitive to a particular identification signal using various optical and electronic components. The major uncertainty of G is in the variability of the operating characteristics of each optical and electrical component from one unit to the next, especially the unit to unit variability of optical taps 24. Being unit to unit related, this variability can be measured in conjunction with all components of pilot tone receiver 30 at time of manufacture and included as calibration data stored in calibration storage 48. The accuracy of G then becomes dependent upon how well it is measured at the time of manufacture and if it drifts with time and environment during use.

As seen in pilot tone receiver 30, detection of R occurs in the digital domain and in the program domain. This allows for an ability to vary the detection bandwidth. By being able to vary the detection bandwidth, pilot tone receiver 30 may be optimized for the signal to noise ratio present at a particular detection point within optical network 10. As optical signals propagate through optical network 10, the signal to noise ratio seen by pilot tone receiver 30 changes as optical channels are added or dropped from any given optical span 20a–20n. For a given accuracy of R at different detection points within optical network 10, different detection bandwidths may be implemented. Also, if at a given detection point a different accuracy of R is desired, the detection bandwidth may be varied to accommodate the new accuracy requirement. Variation of the detection bandwidth may be performed on an optical signal by optical signal basis.

With sine wave amplitude modulation used for identification signals $ID_1$–$ID_n$, an example limit on the narrowness of the detection bandwidth may be the sum of the phase noise of the modulation transmitter 12 and the phase noise at the frequency reference of pilot tone receiver 30. The phase noise of the modulation transmitter 12 controls how wide the frequency is for the identification signal $ID_1$–$ID_n$ modulation. The phase noise at the frequency reference of pilot tone receiver 30 controls a minimum detection bandwidth. An additional limitation on the narrowness of the detection bandwidth is the amount of space allocated in working storage 46 to perform filtering at the detection bandwidth. Signal to noise ratio improves as more information is accumulated and stored for processing. As bandwidth becomes small, the sample time desired increases. Storage requirements for longer sample times is larger than for shorter sample times. High sample rates may require a relatively large amount of storage space. Down sampling performed by filtering and down sampling unit 42 slows the rate that information leaves analog to digital converter 40 so that less storage space is needed for processing. This limitation may be insignificant if sufficient storage space can be provided in pilot tone receiver 30.

One of the requirements for components within optical network 10 relates to reliability. Certain components that carry large numbers of wavelengths and thus large amounts of data traffic should be designed with high reliability characteristics. Reliability in electronic systems can be maximized in several ways. One way is to minimize hardware and the other way is to minimize software. Lots of hardware or lots of software are well known to lead to reliability problems. By selecting the component interface for traffic critical components at the junction between filtering and down sampling unit 42 and optical power processor 44, reliability is maximized without any compromise to accuracy. Any component interface selected prior to analog to digital converter 40 can lead to degraded accuracy due to the added complexity of conveying an analog value across the boundary. A component interface between analog to digital converter 40 and filtering and down sampling unit 42 leads to less reliability due to the relatively high data rate for data across this boundary. Selecting the component interface after optical power processor 44 has less reliability due to the inclusion of software and the electronics associated with the processing of the power measurement.

Figure 3:
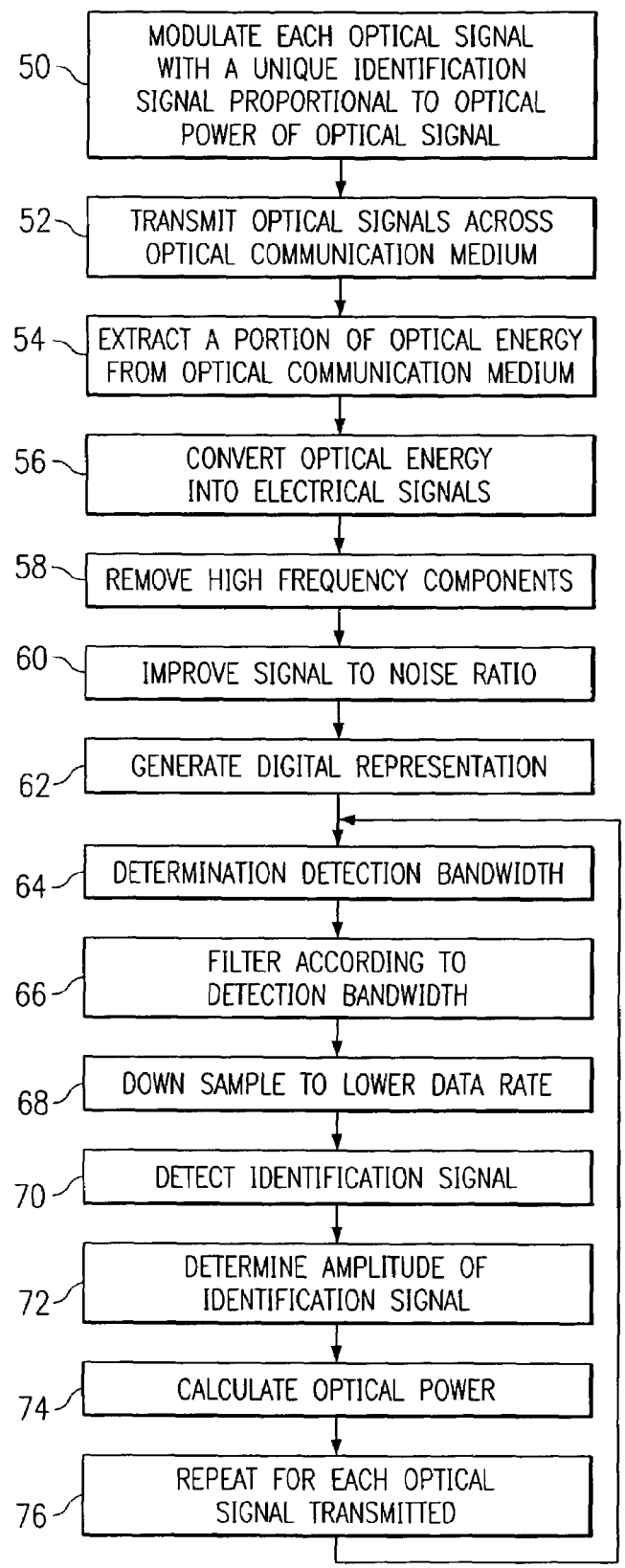
FIG. 3 illustrates a process flow diagram for measuring optical power of optical signals received at the pilot tone receiver and transported in the optical network.

FIG. 3 shows an example process flow diagram for measuring power of an optical signal. The process begins at block 50 where each optical signal 14a–14n is modulated with a unique identification signal. Each identification signal $ID_1$–$ID_n$ is modulated with an amplitude proportional to an optical power of its associated optical signal 14a–14n. The optical signals 14a–14n are multiplexed for transmission across optical communication medium 20 at block 52. A portion of the optical energy transmitted across optical communication medium 20 is extracted at block 54 by optical tap 24. At block 56, the optical energy is converted to electrical signals. At block 58, the high frequency components within the electrical signals are removed. At block 60, the signal to noise ratio of the electrical signals is improved. A digital representation of the electrical signals is generated at block 62. At block 64 the detection bandwidth is determined. At block 66, filtering is performed according to the detection bandwidth. The data rate of the digital representation is down sampled to a lower rate at block 68. An identification signal is detected at block 70 and its amplitude is determined at block 72. An optical power of the associated optical signal is calculated at block 74 in response to the amplitude of the identification signal. The process is repeated for each optical signal and identification signal pair carried by optical communication medium 20. In this manner, optical power of an optical signal is determined without having to process any of the data carried by the optical signal.

Thus, it is apparent that there has been provided, in accordance with the present invention, a system and method for measuring power of optical signals carried over a fiber optic link that satisfies the advantages set forth above. Although the present invention has been described in detail, it should be understood that various changes, substitutions, and alterations may be made herein. For example, pilot tone receiver 30 may include other or fewer functions than those shown and described and still measure the optical power of an optical signal using a detected amplitude of its identification signal. Other examples may be readily ascertainable by those skilled in the art and made herein without departing from the spirit and scope of the present invention as defined by the following claims. Moreover, the present invention is not intended to be limited in any way by any statements or any example made above that is not otherwise reflected in the appended claims.

What is claimed is:

1. A method for measuring power of optical signals carried over a fiber optic link, comprising:
    receiving a plurality of optical signals from the fiber optic link, each optical signal including an identification signal modulated therewith and different from any other optical signal;
    determining an amplitude of each identification signal received, wherein the amplitude of each identification signal received is determined without processing any information carried by the optical signal;
    determining an optical power of each optical signal in response to the amplitude of each identification signal received.

2. The method of claim 1, wherein the identification signals do not interfere with data carried by the optical signals.

3. The method of claim 1, wherein each identification signal does not interfere with any other identification signal.

4. The method of claim 3, wherein each identification signal is sine wave amplitude modulated to its respective optical signal.

5. The method of claim 1, wherein only a portion of the total energy of the plurality of optical signals is received.

6. The method of claim 1, wherein the optical power of each optical signal is proportional to the amplitude of its respective identification signal.

7. The method of claim 1, further comprising:
    down sampling a data rate of the optical signals to provide narrow detection bandwidths.

8. The method of claim 1, further comprising:
    adjusting a detection bandwidth at a detection point of the optical signals.

9. A method f or measuring power of optical signals carried over a fiber optic link, comprising:
    receiving a plurality of optical signals from the fiber optic link, each optical signal including an identification signal modulated therewith;
    determining an amplitude of each identification signal received;
    determining an optical power of each optical signal in response to the amplitude of each identification signal received;
    adjusting a detection bandwidth at a detection point of the optical signals, wherein the detection bandwidth is determined in response to a phase noise of a transmitter used in modulating the identification signals onto the optical signals and a phase noise of a frequency reference used in receiving the optical signals.

10. The method of claim 1, further comprising:
determining an amount of accuracy required on the amplitude of each modulation signal.

11. A system f or measuring power of optical signals carried over a fiber optic link, comprising:
a filtering and down sampling unit operable to receive a digital representation of optical signals carried by an optical transmission medium, the filtering and down sampling unit operable to identify an identification signal associated with a particular one of the optical signals, the filtering and down sampling unit operable to determine an amplitude of the identification signal without processing any information carried by the optical signal;
an optical power processor operable to receive the amplitude of the identification signal from the filtering and down sampling unit, the optical power processor operable to determine an optical power of the particular optical signal in response to the amplitude of the identification signal.

12. A system for measuring power of optical signals carried over a fiber optic link, comprising:
a filtering and down sampling unit operable to receive a digital representation of optical signals carried by an optical transmission medium, the filtering and down sampling unit operable to identify an identification signal associated with a particular one of the optical signals, the filtering and down sampling unit operable to determine an amplitude of the identification signal;
an optical power processor operable to receive the amplitude of the identification signal from the filtering and down sampling unit, the optical power processor operable to determine an optical power of the particular optical signal in response to the amplitude of the identification signal;
wherein the filtering and down sampling unit is operable to adjust a detection bandwidth used in identifying the identification signal.

13. The system of claim 12, wherein the filtering and down sampling unit is operable to decrease a data rate of the digital representation to narrow the detection bandwidth.

14. The system of claim 11, wherein the identification signals for the optical signals do not interfere with each other to allow the optical power of the optical signals to be measured simultaneously.

15. A system for measuring power of optical signals carried over a fiber optic link, comprising:
a filtering and down sampling unit operable to receive a digital representation of optical signals carried by an optical transmission medium, the filtering and down sampling unit operable to identify an identification signal associated with a particular one of the optical signals, the filtering and down sampling unit operable to determine an amplitude of the identification signal;
an optical power processor operable to receive the amplitude of the identification signal from the filtering and down sampling unit, the optical power processor operable to determine an optical power of the particular optical signal in response to the amplitude of the identification signal;
a calibration storage having calibration data used by the optical power processor in determining the optical power of the optical signals.

16. A computer readable medium having code for measuring power of optical signals carried over a fiber optic link, the code operable to:
receive a plurality of optical signals, each of the plurality of optical signals having a unique identification signal modulated therewith, each unique identification signal having an amplitude corresponding to an optical power of its associated optical signal;
adjust a detection bandwidth for each unique identification signal according to a desired power measurement accuracy;
identify each unique identification signal within its associated detection bandwidth;
determine the amplitude for each unique identification signal;
calculate an optical power of each optical signal from the determined amplitudes.

17. The computer readable medium of claim 16, wherein the code is further operable to:
down sample a data rate associated with the plurality of optical signals in order to narrow the detection bandwidth.

18. The computer readable medium of claim 16, wherein the code is further operable to:
limit a width of the detection bandwidth in response to a phase noise associated with transmission of the plurality of optical signals and a phase noise associated with receipt of the plurality of optical signals.

19. The computer readable medium of claim 16, wherein the code is further operable to:
vary the detection bandwidth in response to a signal to noise ratio at a point of receipt of the plurality of optical signals.

20. The computer readable medium of claim 16, wherein the code is further operable to:
calculate the optical power of the optical signals in response to a desired accuracy of the identification signal amplitudes, a desired accuracy of the modulation index associated with the identification signals, and a desired accuracy of the gain at a detection point of the identification signals.

* * * * *